April 24, 1928.

H. W. HYDE 1,667,116

SPRING SUSPENSION FOR VEHICLES

Filed May 28, 1923

Inventor:
Henry Webb Hyde.
By Macleod, Calver, Copeland & Dike,
Attorneys.

Patented Apr. 24, 1928.

1,667,116

UNITED STATES PATENT OFFICE.

HENRY WEBB HYDE, OF NORTH COHASSET, MASSACHUSETTS, ASSIGNOR TO HYDE ENGINEERING COMPANY, OF BOSTON, MASSACHUSETTS, A CORPORATION OF MASSACHUSETTS.

SPRING SUSPENSION FOR VEHICLES.

Application filed May 28, 1923. Serial No. 641,934.

This invention relates to vehicle spring suspensions of the general type shown and described in my prior application for Letters Patent, filed September 29, 1921, Serial No. 504,160.

As explained in said prior application, the invention disclosed therein consists primarily in providing the vehicle with longitudinal springs or spring reaches connected at their ends, either directly or indirectly, with the axles, and in supporting the body on the spring reaches intermediate the ends of the latter in such a manner as to permit said body to rock freely, with respect to and independently of the reaches, upon a horizontal, transverse axis, so that tilting or rocking of the reaches, caused by a vertical movement of either the front or rear wheels and the axle carried thereby, will not be transmitted to the body and will not tend to tip or pitch the same, said body being permitted, by rocking about its axis with respect to the reaches, to maintain its substantially horizontal position, its only movement being a slight vertical one in substantially rectilinear direction.

The present invention relates to an improved form of suspension of this general type wherein the balancing effect of simultaneous forces acting on each side of the center of gravity occurs equally well from either end of the car, so that not only the inertia of the car frame and load superimposed on it tends to keep the body horizontal, but the reactive forces themselves are equalized in relation to the center of gravity and the tendency to pitch is thereby removed. The form of suspension to which the invention relates is also distinguished from suspensions heretofore proposed, in that it possesses stability in relation to varying body loads, particularly the live load in the tonneau.

In another application filed May 28, 1923, Serial No. 641,933, is shown a spring suspension so constructed and arranged as to exert upon the body of the vehicle, when either axle is moved vertically, upward forces the moments of which about the centre of gravity of the body are balanced so as to stabilize the latter, and the present invention has for an object to provide a modification of the construction last referred to, said modification including a combined balancing spring and stabilizer of novel construction adapted not only to assist in stabilizing the body, but further to absorb any shocks which might otherwise be communicated to said body tending to disturb the equilibrium thereof or to set up oscillations therein. The invention also pertains to the construction of the balancing or stabilizing spring referred to.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practised without departure from the spirit and scope thereof.

Figure 1:
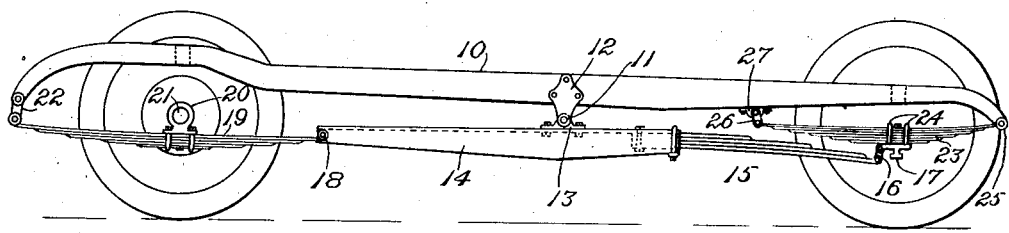
Fig. 1 is a side elevation of a spring suspension constructed in accordance with the invention.
Figure 2:
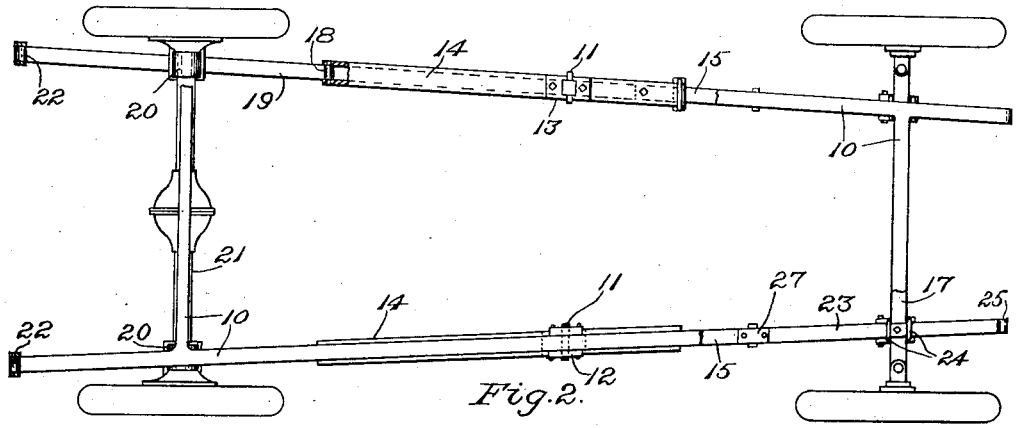
Fig. 2 is a plan view thereof, the parts being partly broken away in order to illustrate the construction and arrangement more clearly.
Figure 3:
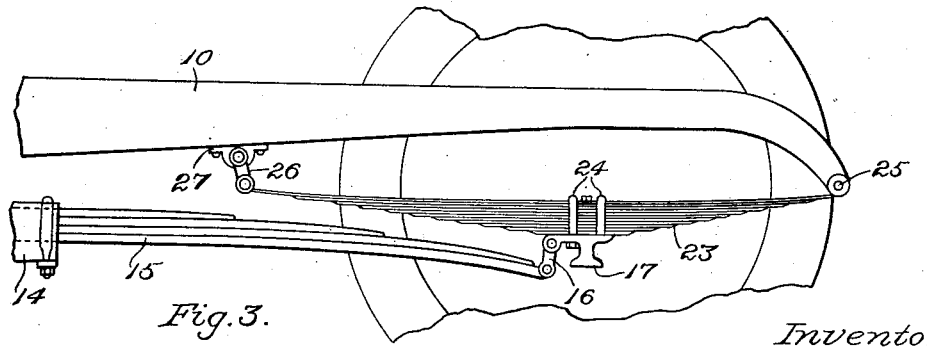
Fig. 3 is an enlarged side elevation of the forward end of the spring suspension shown in Fig. 1, illustrating the construction of the balancing or stabilizing spring.

The principle of operation of a spring suspension of the general type of that shown herein is fully explained in my prior application, Serial No. 504,160. For the purposes of the present description this principle may be briefly outlined as follows:

In the ordinary vehicle, whether provided with elliptical, semi-elliptical, or cantilever springs, the springs are, in effect, rigidly secured to the body or frame at or near the ends thereof, and any shock or blow on a wheel, due to unevenness in the road, which causes the wheel to rise or fall suddenly, is communicated directly to the body at the maximum distance from the center of gravity, so that the moments of gyration about the centre of gravity are at a maximum, thus causing pitching.

In the type of spring suspension under consideration, on the contrary, if the front wheel, for example, be raised, owing to an unevenness in the road, the tendency is for the spring reach to turn about the pivot afforded by the rocker on which the body is supported and exert an upward force at this point, which force is, however, either applied so near the center of gravity that the moments of gyration are negligible, or is neutralized by other forces on the other side of the center of gravity. Likewise, when the rear wheel goes over an obstruction or drops into a hole, the front spring member and front wheel receive the major part of the reaction and the body is affected relatively little. The effect on the body in either case is merely to lift the pivot, and consequently the body, vertically to a slight extent, and not to rock said body from front to back, so that the body is not given any pitching motion. The action described is permitted by the pivotal or rocking connection between the body and the spring reaches. If there were a rigid connection at this point, the blow would give the body an entirely different movement and would not be absorbed by the opposite end of the spring reach.

Referring now to the drawings, there is shown therein a pair of spring reaches to which the body frame 10 is connected by means of coaxial pivots 11 interposed between brackets 12 and 13 on the body and reaches, respectively, the axis of the said pivots being preferably located slightly in front of the center of gravity of the body. Each of said reaches is composed of a substantially rigid beam 14 having at its forward end a leaf spring extension 15 rigidly secured thereto and comprising a plurality of superimposed relatively thick or heavy leaves. The extensions 15 are connected at their forward ends by shackles 16 with the front axle 17 of the vehicle. The rear ends of the beams 14 are pivotally connected, as at 18, to the forward or inner ends of semi-elliptical springs 19 supported intermediate their ends by hangers 20 from the rear axle 21. The springs 19 are each composed of a plurality of superimposed leaves which are preferably somewhat thinner and lighter than the leaves forming the spring extensions 15 of the reaches. At their rear or outer ends, the springs 19 are connected by shackles 22 with the rear end of the body frame 10.

The operation of the device, as thus far described, is substantially as more fully explained in application Serial No. 641,933, above referred to. On raising the front axle suddenly, as in encountering a bump, the spring 23 is compressed, exerting an upward force at the front end of the car, the ends of the springs 15 are raised which turns the beam 14 about the pivot 11, the beam then depresses the spring 19 at the point 18, and the spring 19 turns about the axle 21 and causes an upward force on the body at 22, the point of application of this force being considerably further away from the centre of gravity than the average effective force of springs 23, it thereby counteracts the moments of gyration of springs 23.

At the same time, the beam 14 produces an upward force at the pivot 11, but being very near the centre of gravity its moments of gyration are small. It is thus that the sum of the three forces have a final resultant, tending to raise the body as a whole with a slightly greater tendency at the front end as is necessary to follow the broad contours of the road but not sufficient to cause pitching.

When the rear wheels reach the same bump the rear axle rises, the major part of the blow reaches the frame through the pivot 11 and the minor part at 22. The distance from the centre of gravity of these two joints, however, being widely different, the two forces counteract each other, as previously explained.

In addition to the above, a portion of the blow acting at either end is transmitted back to the ground at the opposite end, so that double benefit is derived from the resilience of the pneumatic tires.

In order further to stabilize the otherwise free forward end of the body, longitudinal semi-elliptical springs 23 are interposed between said body and the front axle 17. Said springs are secured, as by U-bolts 24, intermediate their ends to the top of the axle 17, the forward end of each of said springs being pivotally connected, as at 25, to the front end of the body frame 10, and the opposite end being connected by a shackle 26 with a bracket 27 secured to said body frame at the rear of its front end. In accordance with the present invention, however, the springs 23 are constructed to act as balancing and stabilizing springs, and to this end are each composed of a considerable number of quite thin or light leaves. The springs 23 are in appearance and method of attachment substantially the same as is common practice for semi-elliptical springs at the front end of a car, but are composed of leaves very much thinner that it would be possible to use normally, since their supporting power would be far too small. In accordance with the present invention, however, since the axis of the pivots 11 is located forward of the normal center of gravity of the body, the load is primarily carried by the pivots 11 and springs 19, so that the springs 23 are required to sustain only a relatively small part of the load and that only under abnormal conditions. If their supporting power be approximately one-half that of the usual springs their flexibility is about four times as great, following the practice well known to spring engineers. This renders the moments of gyration caused by these springs one-quarter the normal.

In addition to the above advantages it has been found by practice that a spring of this nature has a relatively high internal friction caused by the multiplicity of thin leaves, which tends to dampen out periodic oscillation and thereby accomplish the same result normally obtained by the addition of a shock absorber. It is, of course, understood that the construction is not limited to a semi-elliptic spring as shown. A full elliptic would do equally well or any of the usual types, provided the same flexibility and load carrying capacity is substituted.

In this specification, the phrase "spring reaches" is employed as a comprehensive term to denote longitudinal members through which the body is supported from the axles and composed wholly or in part of springs. The term, therefore, is to be taken as including a unitary spring, or a beam having spring extensions at both ends, as well as a reach composed of a substantially rigid beam having a spring extension at one end. It will be understood that when the spring reach includes a rigid beam, as herein shown, the connection between the beam and the spring extension or extensions is a rigid one in the sense that there is no pivotal or other movable connection at this point.

The words "rear", "front", and similar expressions are herein used as convenient illustrative terms, it being obvious that, although the construction shown is preferred for most purposes, the suspension might be oppositely disposed, the pivotal connection between the body and the reaches being in the rear instead of in front of the center of gravity of the body, and the other parts being correspondingly arranged. These and other modifications of the construction shown will, however, be readily apparent to those skilled in the art without further description in detail.

Having thus described my invention, I claim:

1. In a vehicle having a body and axles, a spring suspension including a spring reach connected with each axle at one side of the vehicle, a connection between said reach and the body at one side of the center of gravity thereof upon which the body is free to rock, and a balancing spring at the same side of the center of gravity and connected at opposite ends to the body.

2. In a vehicle having a body and axles, a spring suspension comprising a pair of spring reaches, a connection between said reaches and the body upon which the latter is free to rock with respect to the former, said reaches being directly connected at one end to one of the axles, relatively flexible springs connecting said last named axle with the body, and semi-elliptical springs supported on the other axle and pivotally connected at one side of the axle with the body and at the other side of the axle with the spring reaches and forming continuations of the latter.

3. A spring suspension for a vehicle comprising a spring reach having a connection with the body at one side of the center of gravity of the body and about which connection the body is free to rock, and a balancing spring supported independently of said reach and located at the same side of the center of gravity.

4. In a vehicle having a body and axles, a spring suspension including a spring reach at one side of the body having a freely rocking connection with the body at one side of the center of gravity thereof whereby vertical forces will be applied to the body at opposite sides of the center of gravity when one of the axles is raised, and a balancing, stabilizing or shock absorbing member supported between the body and an axle and connected at its opposite ends to the body.

5. A spring suspension for a vehicle having an intermediate portion thereof pivotally connected to the body of the vehicle in front of the center of gravity and about which connection the body is free to rock, and a balancing spring interposed between the front axle and body and supported independently of said spring suspension.

6. In a vehicle having a body and axles, a spring suspension comprising a pair of spring reaches, a connection between said reaches and the body upon which the latter is free to rock with respect to the former, said reaches being directly connected at one end to one of the axles, semi-elliptical springs supported on said last named axle and connected at both sides of the axle with the body, said springs being each composed of a considerable number of superimposed, thin leaves adapted by frictional engagement upon one another to constitute a balancing, stablizing or shock absorbing member, and semi-elliptical springs supported on the other axle and connected at one side of the axle with the body and at the other side of the axle with the spring reaches and forming continuations of the latter.

7. A spring suspension for a vehicle comprising a spring reach having connection with the body at one side of the center of gravity thereof and about which connection the body is free to rock, means for connecting one end of said reach to the end of the body at the opposite side of the center of gravity, means for connecting the opposite end of the reach to an axle, and a balancing leaf spring of less flexibility than said spring suspension independently mounted between said axle and the body.

8. In a vehicle having a body and axles, a spring suspension comprising an intermediate rigid member pivoted to the body at one side of one center of gravity thereof and having at one end a leaf spring extension rigidly connected thereto, means for pivotally connecting said extension at its free end to one of said axles, a leaf spring extension pivotally connected to the opposite end of said member, and means for connecting said last spring extension to the other axle and also to the end of the body.

9. A spring suspension comprising an intermediate rigid member pivotally connected to the body at one side of the center of gravity to permit rocking movement of the body about said connection, said member having a leaf spring extension at each end of different flexibility, one extension terminating at an axle and the other terminating at an end of the body.

10. A spring suspension comprising an intermediate rigid member pivotally connected to the body at one side of the center of gravity to permit rocking movement of the body about said connection, said member having a leaf spring extension at each end of different flexibility, one extension terminating at an axle and the other terminating at an end of the body, and one of said extensions being pivotally connected to said rigid member.

11. A spring suspension comprising an intermediate rigid member pivotally connected to the body at one side of the center of gravity to permit rocking movement of the body about said connection, said member having a leaf spring extension at each end of different flexibility, one extension terminating at an axle and the other terminating at an end of the body, and a leaf spring cooperating with said axle and the body independently of said spring suspension.

12. A spring suspension comprising an intermediate rigid member pivotally connected to the vehicle body adjacent to the center of gravity thereof, spring extensions of different flexibility at opposite ends of said member, each thereof connected to an axle and one terminating at an axle, a balancing spring between an axle and the body and having greater flexibility than one of said spring extensions.

In testimony whereof I affix my signature.

HENRY WEBB HYDE.